(12) United States Patent
Siering et al.

(10) Patent No.: US 10,658,713 B2
(45) Date of Patent: May 19, 2020

(54) COOLING DEVICE FOR STORED ENERGY SOURCES

(71) Applicant: Bayerische Motoren Werke Aktiengesellschaft, Munich (DE)

(72) Inventors: Sebastian Siering, Munich (DE); Florian Einoegg, Munich (DE); Michael Huber, Munich (DE); Nicolas Flahaut, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/730,182

(22) Filed: Oct. 11, 2017

(65) Prior Publication Data

US 2018/0034119 A1 Feb. 1, 2018

Related U.S. Application Data

(63) Continuation of application No. PCT/EP2016/064295, filed on Jun. 21, 2016.

(30) Foreign Application Priority Data

Aug. 11, 2015 (DE) .................... 10 2015 215 253

(51) Int. Cl.
*H01M 10/613* (2014.01)
*B60L 11/18* (2006.01)
(Continued)

(52) U.S. Cl.
CPC ........... *H01M 10/613* (2015.04); *B60L 50/50* (2019.02); *B60L 58/26* (2019.02); *F28F 9/026* (2013.01);
(Continued)

(58) Field of Classification Search
CPC ........... H01M 10/613; H01M 2220/20; H01M 10/6567; H01M 10/617; H01M 10/625;
(Continued)

(56) References Cited

U.S. PATENT DOCUMENTS 7,808,783 B2 * 10/2010 Goth ................... F25B 49/02
165/80.3
8,605,437 B2 * 12/2013 Wei .................... H05K 7/20781
361/699

(Continued)

FOREIGN PATENT DOCUMENTS

CN 103124884 A 5/2013
DE 103 52 514 A1 5/2004
(Continued)

OTHER PUBLICATIONS

Haussmann, Roland, "Cooling device for vehicle battery in vehicle battery assembly, has multiple battery cell groups, where multiple cooling modules are coupled to coolant circuit, and each cooling module is assigned single battery cell group", 2012, Entire Document (Translation of DE102010032900). (Year: 2012).*

(Continued)

*Primary Examiner* — Jayprakash N Gandhi
*Assistant Examiner* — Stephen S Sul
(74) *Attorney, Agent, or Firm* — Crowell & Moring LLP

(57) ABSTRACT

A cooling device for stored energy sources, in particular for motor vehicles, is provided. The cooling device includes: multiple separate cooling modules, through which coolant can flow, for absorbing heat from the stored energy source, each module having an inflow and an outflow; a common feed line, from which the inflows of the cooling modules branch off; and a common discharge line, into which the outflows of the cooling modules open.

20 Claims, 6 Drawing Sheets

(51) Int. Cl.
| | |
|---|---|
| *F28F 9/02* | (2006.01) |
| *H01M 10/617* | (2014.01) |
| *H01M 10/625* | (2014.01) |
| *H01M 10/6556* | (2014.01) |
| *H01M 10/6567* | (2014.01) |
| *H01M 10/6568* | (2014.01) |
| *H01M 10/6569* | (2014.01) |
| *B60L 50/50* | (2019.01) |
| *B60L 58/26* | (2019.01) |
| *F28D 21/00* | (2006.01) |
| *H01M 10/44* | (2006.01) |

(52) U.S. Cl.
CPC ....... *H01M 10/617* (2015.04); *H01M 10/625* (2015.04); *H01M 10/6556* (2015.04); *H01M 10/6567* (2015.04); *H01M 10/6568* (2015.04); *H01M 10/6569* (2015.04); *B60L 2240/545* (2013.01); *F28D 2021/0029* (2013.01); *H01M 10/443* (2013.01); *H01M 2220/20* (2013.01); *Y02T 10/7005* (2013.01); *Y02T 10/705* (2013.01)

(58) Field of Classification Search
CPC ......... H01M 10/6556; H01M 10/6569; H01M 10/6568; H01M 10/443; F28F 9/026; Y02T 10/705; Y02T 10/7005; F28D 2021/0029; B60L 2240/545; B60L 11/1874; B60L 11/18; H05K 7/20627–0636; H05K 7/20663–20672; H05K 7/20763–20772; H05K 7/208–20809; H05K 7/20509; H05K 7/20872–20881; H05K 7/20927–20936
USPC .......................... 361/688, 689, 699, 700, 701
See application file for complete search history.

(56) References Cited

U.S. PATENT DOCUMENTS

| | | | |
|---|---|---|---|
| 2002/0007641 A1 | 1/2002 | Marsala | |
| 2004/0089439 A1 | 5/2004 | Treverton et al. | |
| 2008/0110606 A1* | 5/2008 | Gorbounov | F25B 39/028 165/174 |
| 2010/0252232 A1* | 10/2010 | Reich | F28D 20/0034 165/48.1 |
| 2012/0234518 A1* | 9/2012 | Brodie | B60H 1/00278 165/104.31 |
| 2013/0029193 A1 | 1/2013 | Dyer et al. | |
| 2013/0180690 A1* | 7/2013 | Yura | F24F 3/065 165/121 |
| 2014/0038009 A1 | 2/2014 | Okawa et al. | |
| 2014/0071624 A1* | 3/2014 | Aoki | F28D 15/00 361/699 |
| 2014/0198453 A1* | 7/2014 | Zhang | H01L 23/473 361/699 |
| 2015/0027680 A1* | 1/2015 | Eguchi | F24F 11/0008 165/222 |
| 2015/0121950 A1* | 5/2015 | Chowdhury | F25B 39/02 62/515 |
| 2015/0194711 A1* | 7/2015 | Rawlinson | B60L 11/1874 429/62 |
| 2015/0311572 A1 | 10/2015 | Sung et al. | |
| 2016/0023532 A1* | 1/2016 | Gauthier | B60L 1/06 62/243 |
| 2016/0285145 A1 | 9/2016 | Flahaut et al. | |
| 2016/0298890 A1* | 10/2016 | Esformes | F25B 39/02 |
| 2016/0351981 A1* | 12/2016 | Porras | H01M 10/6569 |

FOREIGN PATENT DOCUMENTS

| | | |
|---|---|---|
| DE | 601 25 085 T2 | 7/2007 |
| DE | 10 2008 021 753 A1 | 11/2009 |
| DE | 10 2010 032 900 A1 | 2/2012 |
| DE | 11 2012 001 739 T5 | 1/2014 |
| DE | 11 2012 003 115 T5 | 8/2014 |
| DE | 10 2013 208 396 A1 | 11/2014 |
| DE | 10 2013 225 523 A1 | 6/2015 |
| DE | 10 2014 106 954 A1 | 11/2015 |
| DE | 10 2014 108 993 A1 | 12/2015 |
| EP | 2 787 314 A1 | 10/2014 |
| WO | WO 2014/081138 A1 | 5/2014 |

OTHER PUBLICATIONS

International Search Report (PCT/ISA/210) issued in PCT Application No. PCT/EP2016/064295 dated Nov. 11, 2016 with English translation (Nine (9) pages).

German-language Office Action issued in counterpart German Application No. 10 2015 215 253.7 dated May 9, 2016 (Seven (7) pages).

German-language Written Opinion (PCT/ISA/210) issued in PCT Application No. PCT/EP2016/064295 dated Nov. 11, 2016 (Eleven (11) pages).

Chinese-language Office Action issued in counterpart Chinese Application No. 201680024953.9 dated Jul. 26, 2019 with English translation (15 pages).

\* cited by examiner

COOLING DEVICE FOR STORED ENERGY SOURCES

CROSS REFERENCE TO RELATED APPLICATIONS

This application is a continuation of PCT International Application No. PCT/EP2016/064295, filed Jun. 21, 2016, which claims priority under 35 U.S.C. § 119 from German Patent Application No. 10 2015 215 253.7, filed Aug. 11, 2015, the entire disclosures of which are herein expressly incorporated by reference.

BACKGROUND AND SUMMARY OF THE INVENTION

The invention relates to a cooling apparatus for energy stores, in particular for motor vehicles, and to an energy store system as well as a motor vehicle having a cooling apparatus of this type.

Defined thermal management of the batteries/battery cells/battery cell modules is required to safeguard the range, service life and performance available for electric and hybrid vehicles. Here, it is decisive to keep the temperature spread between the cells and cell modules within the high voltage store as low as possible. Active and passive cooling systems are used for this purpose.

Increasing requirements made of the range and performance require, for example, an increasing number of cells which are connected in series and/or in parallel. As a result, the dimensions of the high voltage stores in the vehicle increase. This increases the challenge to achieve a more homogeneous cooling action over the entire dimension.

It is an object of the present invention to achieve more homogeneous cooling of the individual cell modules. This and other objects are achieved by way of a cooling apparatus for energy stores, an energy store system, and a motor vehicle equipped with the cooling apparatus, in accordance with embodiments of the invention.

In accordance with one exemplary embodiment of the invention, a cooling apparatus for energy stores is provided, in particular for motor vehicles, having a plurality of separate cooling modules for absorbing heat from the energy store, through which cooling modules refrigerant can flow, and which cooling modules have in each case one inlet and one outlet; a common feed line, from which the respective inlets of the cooling modules branch, and a common discharge line, into which the respective outlets of the cooling modules open. This exemplary embodiment affords the advantage of modular construction. For example, the individual cooling modules can be identical and, depending on the vehicle type/energy store type, a suitable number of connected cooling modules are used which together form the cooling apparatus. The production costs can be reduced by way of a modular construction of this type. Cooling paths which are connected in parallel are configured by virtue of the fact that the individual cooling modules are attached to the common feed line. A more uniform distribution to the cooling modules which are connected in parallel can be achieved as a result. This has advantageous effects on the range, service life and performance of electric and hybrid vehicles. Here, the parallel paths can correspond, for example, to the electric connection of the cells and/or cell modules, since the waste heat which is produced in paths which are connected electrically in parallel is comparable.

In accordance with a further exemplary embodiment of the invention, expansion members are arranged in the respective inlets. By virtue of the fact that the expansion members are arranged in the respective inlets, the refrigerant upstream of the expansion members, that is to say in the common feed line, is held at a high pressure level. Therefore, the distribution to the individual inlets into the cooling modules takes place at a high pressure level, that is to say within a high pressure range, as a result of which a more homogeneous distribution to the cooling modules which are connected in parallel can be achieved. This has the advantage that high temperature spreads between the refrigerant paths which are connected in parallel (the cooling modules which are connected in parallel) can be avoided, and therefore a more uniform temperature level of all energy store modules and energy store cells within the high voltage store can be achieved. More homogeneous cooling is achieved by way of this homogeneous distribution of the refrigerant to a large number of individual parallel paths, which can improve the range, service life and performance of electric and hybrid vehicles. If the distribution took place after the expansion of the refrigerant, a homogeneous distribution would be difficult on account of the low quantity of residual liquid.

In accordance with a further exemplary embodiment of the invention, the expansion members are electric expansion valves, thermal expansion valves or throttles.

In accordance with a further exemplary embodiment of the invention, the expansion members are at the same time shut-off valves. A shut-off valve at an inlet of the common feed line can be dispensed with as a result.

According to a further exemplary embodiment of the invention, the expansion members with a shut-off function are throttling solenoid valves or thermostatic expansion valves.

In accordance with a further exemplary embodiment of the invention, a shut-off valve for interrupting the refrigerant flow is provided in the common feed line upstream of the first inlet and/or downstream of the last outlet. In particular, the shut-off valve is a solenoid valve. In addition to an interruption of the flow, for example in order to switch the cooling function of the cooling apparatus on and off, a shut-off valve affords the advantage that the cooling can be cycled and regulated.

In accordance with a further exemplary embodiment of the invention, the cooling modules have a plurality of flat tubes which are arranged in one plane and are connected to one another at their longitudinal ends by way of header tubes. In particular, all of the flat tubes of a cooling module are connected in series to one another by way of the header tubes, with the result that the refrigerant can flow through them one after another.

In accordance with a further exemplary embodiment of the invention, the common feed line and the common discharge line are configured separately from one another. In particular, the common feed line and the common discharge line are configured in each case by way of a separate tube line.

In accordance with a further exemplary embodiment of the invention, the common feed line and the common discharge line are configured within one line, the feed line and the discharge line being separated from one another by way of a dividing wall which runs in the longitudinal direction of the line.

In accordance with a further exemplary embodiment of the invention, the cooling modules are arranged in a flat and overlap-free manner.

In accordance with a further exemplary embodiment of the invention, the cooling modules are of identical configuration.

In accordance with a further exemplary embodiment of the invention, a heat exchanger is provided downstream of the last outlet, which heat exchanger is configured for separating liquid and gaseous components of the refrigerant.

In accordance with a further exemplary embodiment of the invention, a discharge line for the gaseous components is connected to an inlet of a compressor. This has the advantage that gas can be fed to the compressor as far as possible without liquid components. This is advantageous for the operation of the compressor.

In accordance with a further exemplary embodiment of the invention, a wall of the heat exchanger, which wall is covered with the liquid components during operation, is connected to the common feed line in a thermally conducting manner. This has the advantage that the temperature of the refrigerant in the common feed line is lowered and the temperature of the liquid components in the heat exchanger is increased. The efficiency of the cooling apparatus is increased by way of the temperature reduction in the common feed line. Superheating of the fluid which enters into the heat exchanger is ensured by way of the temperature increase of the liquid components in the heat exchanger, as a result of which an improved separation of gaseous and liquid components can be realized.

In accordance with a further exemplary embodiment of the invention, the expansion members are provided in pairs, two expansion members being provided within a single component with a fluid inlet, both expansion members being connected to the same fluid inlet. This has the advantage that a distribution of the refrigerant is carried out before the expansion and therefore on the liquid side, as a result of which a more homogeneous distribution can be realized.

Moreover, the invention relates to an energy store system having an energy store and a cooling apparatus in accordance with any of the preceding exemplary embodiments.

Moreover, the invention relates to a motor vehicle having a cooling apparatus of this type or an energy store system of this type.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
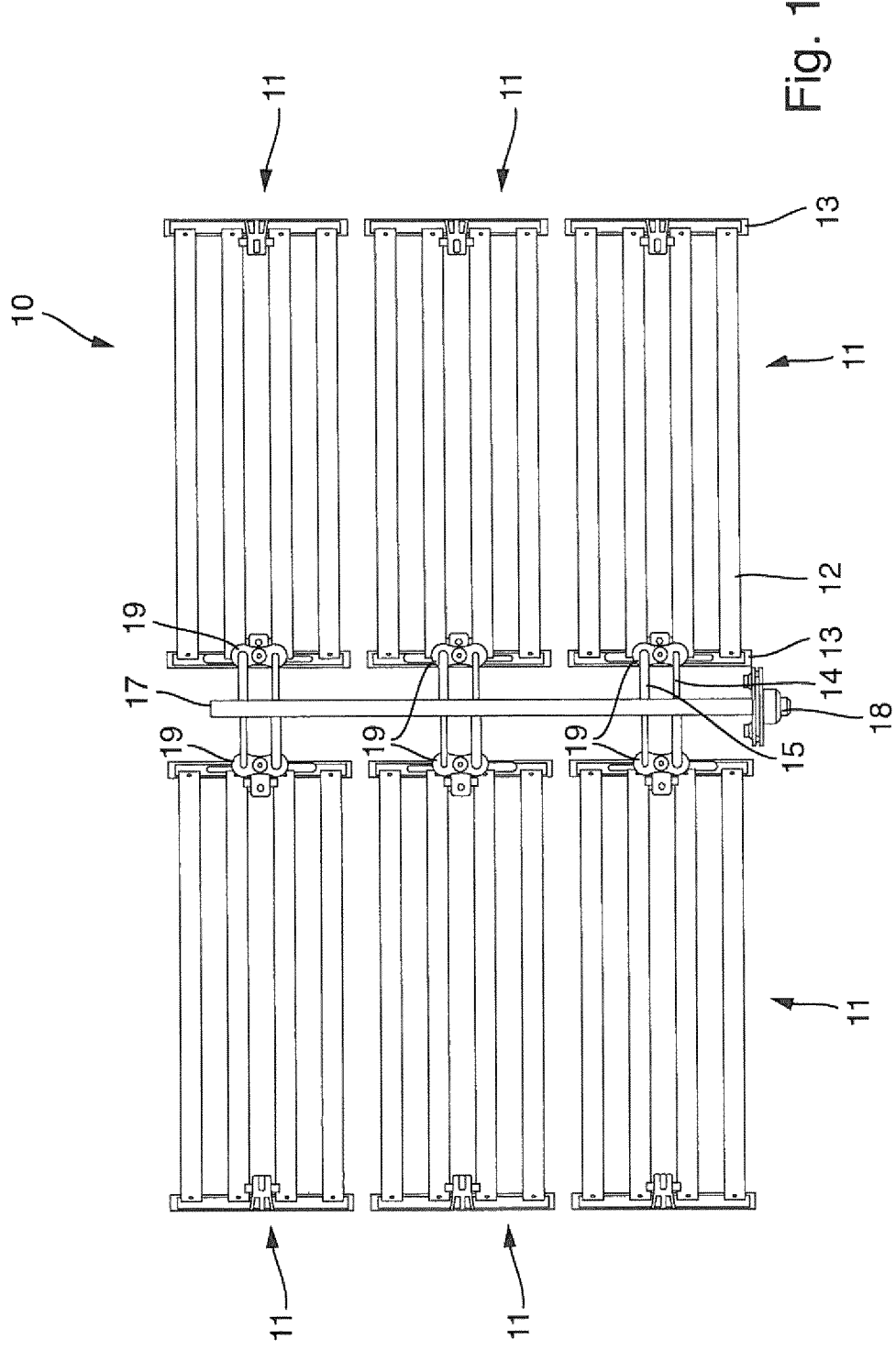
FIG. 1 diagrammatically shows a cooling apparatus in accordance with a first exemplary embodiment of the invention in a plan view.
Figure 2:
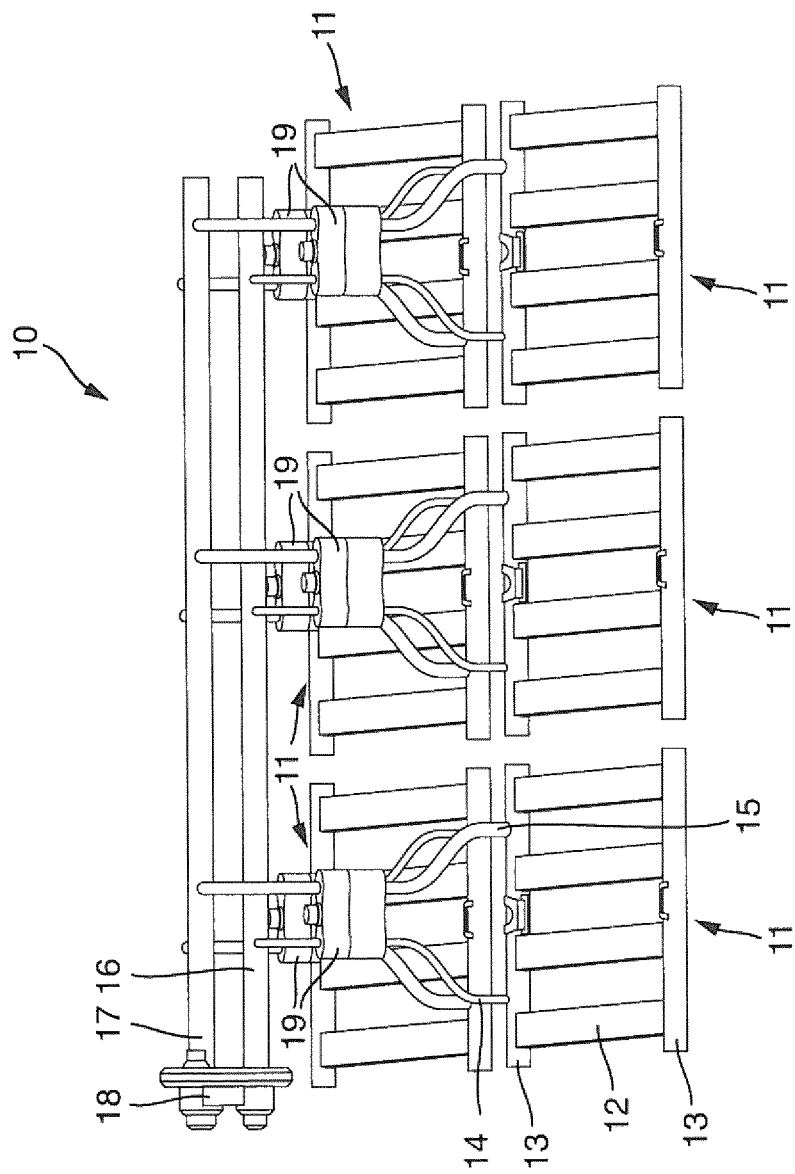
FIG. 2 diagrammatically shows the cooling apparatus from FIG. 1 in a three-dimensional view.

FIGS. 1 and 2 diagrammatically show a cooling apparatus 10 in accordance with a first exemplary embodiment of the invention. The cooling apparatus 10 is used for cooling one or more energy stores (not shown) for electric or hybrid vehicles. The cooling apparatus 10 includes a plurality of cooling modules 11 which are configured separately from one another. All of the cooling modules 11 are preferably of identical construction. Each of the cooling modules is formed by way of a plurality of flat tubes 12 which run parallel to one another, are hollow on the inside, and are connected fixedly to one another at their longitudinal ends via header tubes 13. The header tubes 13 connect the interior spaces of the flat tubes 12 to one another in accordance with a desired pattern, with the result that the flat tubes 12 of a cooling module 11 can be flowed through one after another by refrigerant in accordance with a desired pattern. To this end, at one of their longitudinal ends, the interior spaces of two adjacent flat tubes 12 are either connected to one another via the interior space of a header tube 13 or are separated from one another via a dividing wall in said interior space of the header tube 13. In this way, the flat tubes 12 of a cooling module 11 can be flowed through, for example, in a zigzag-shaped manner (refrigerant flows in an opposite direction in adjacent flat tubes). The cooling modules 11 are arranged in a flat and overlap-free manner with respect to one another. Furthermore, the cooling modules 11 are arranged in a flat manner adjacently with respect to the energy store modules to be cooled.

Each cooling module 11 has an inlet 14, via which refrigerant can be fed into the respective cooling module 11, and an outlet 15, via which the refrigerant can be discharged from the cooling module 11 again. A single inlet 14 and a single outlet 15 are preferably provided per cooling module 11. The inlets 14 of all cooling modules 11 open into a common feed line 16, and the outlets 15 of all cooling modules 11 open into a common discharge line 17. In the first exemplary embodiment, the common feed line 16 and the common discharge line 17 are formed in each case by a separate tube line. In said embodiment, a shut-off valve 18 is provided at the inlet of the common feed line 16 and/or at the outlet of the common discharge line 17, which shut-off valve 18 shuts off or cycles a refrigerant flow in the common feed line 16 and/or in the common discharge line 17. More precisely, the shut-off valve 18 is positioned upstream of the first inlet 14 in the flow direction of the refrigerant and/or downstream of the last outlet 15 in the flow direction of the refrigerant. The shut-off valve 18 is preferably provided only in the common feed line 16.

An expansion member 19 which expands a refrigerant flow in the associated inlet 14 is arranged in each of the inlets 14. For example, electric expansion valves, thermal expansion valves or throttles can be used as expansion members.

Figure 3:
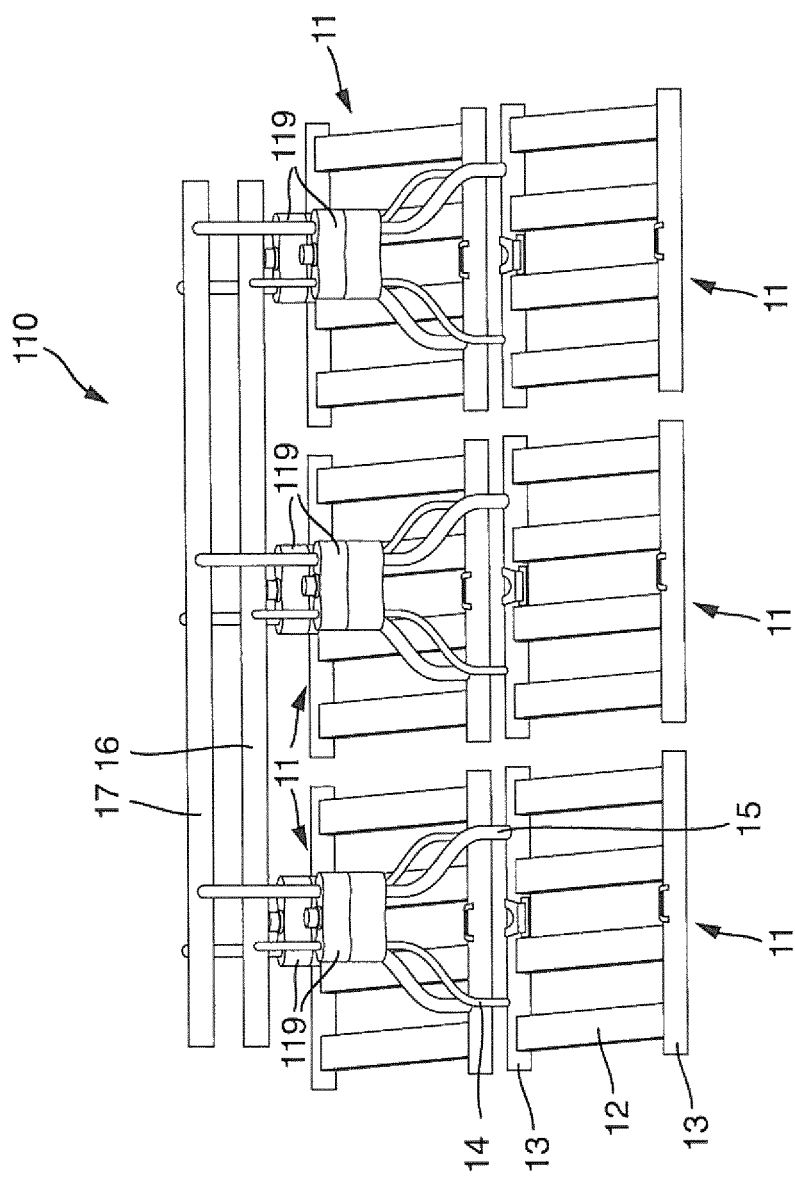
FIG. 3 diagrammatically shows a cooling apparatus in accordance with a second exemplary embodiment of the invention.

FIG. 3 diagrammatically shows a cooling apparatus 110 in accordance with a second exemplary embodiment. This exemplary embodiment differs from the first exemplary embodiment only in that the shut-off valve 18 is omitted and expansion members 119 are provided instead of the expansion members 19, which expansion members 119 have a shut-off function in addition to the expansion function. Here, for example, throttling solenoid valves or thermostatic expansion valves can be used. Apart from this difference, reference is made to the description of the first exemplary embodiment.

Figure 4:
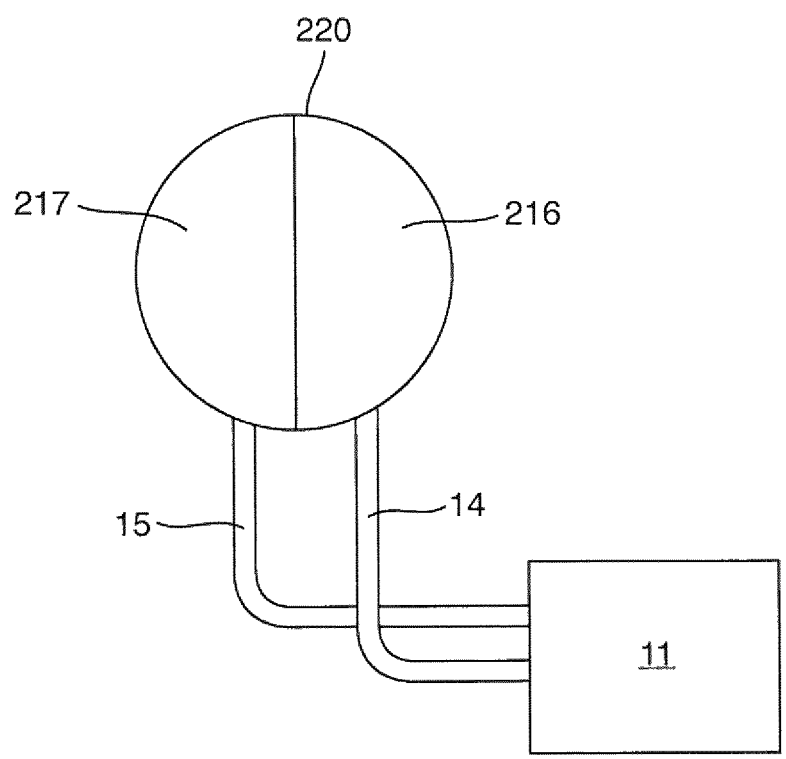
FIG. 4 diagrammatically shows a part of a cooling apparatus in accordance with a third exemplary embodiment of the invention in a perspective view.

FIG. 4 diagrammatically shows a part of a cooling apparatus in accordance with a third exemplary embodiment of the invention. This exemplary embodiment differs from the first and second exemplary embodiments merely in terms of the configuration of the common feed line and the common discharge line. In this exemplary embodiment, the common feed line 216 and the common discharge line 217 are configured within a tube line 220, the interior of the tube line being divided by way of a dividing wall which runs in the longitudinal direction. Apart from this difference, reference is made to the description of the first and second exemplary embodiments.

Figure 5:
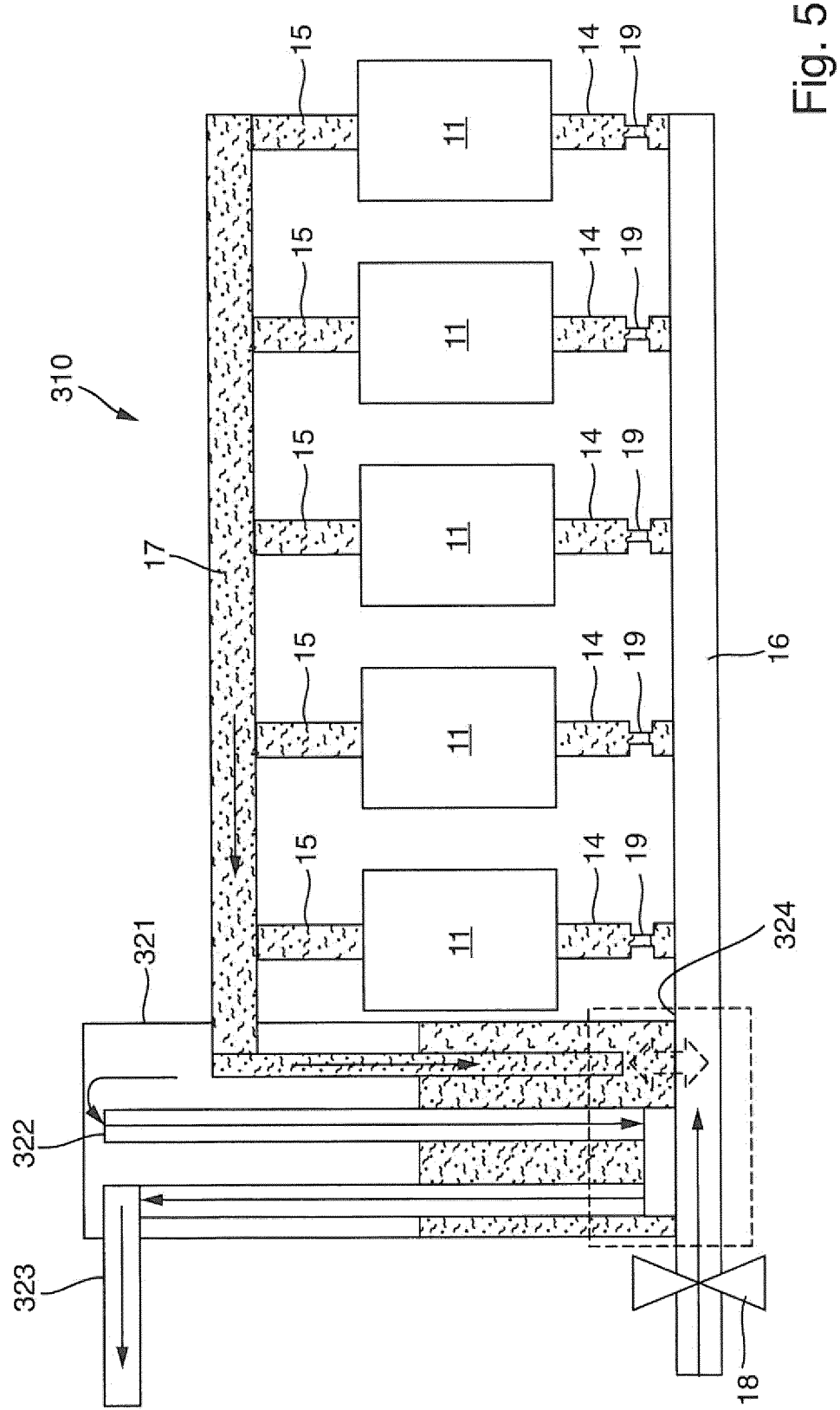
FIG. 5 diagrammatically shows a cooling apparatus in accordance with a fourth exemplary embodiment.

FIG. 5 diagrammatically shows a cooling apparatus 310 in accordance with a fourth exemplary embodiment. The previous description of the other exemplary embodiments applies to this exemplary embodiment. In this exemplary embodiment, a heat exchanger 321 is additionally provided, which is also called a battery internal heat exchanger. The gas/liquid ratio along the refrigeration circuit of the cooling apparatus 310 changes in a known way as a result of the compression and expansion processes. The refrigerant which leaves the common discharge line 17 is already for the most part in a gaseous state. It is desirable, however, to evaporate the liquid component downstream of the common discharge line 17 as completely as possible, because this is advantageous for the operation of the compressor (not shown) which is arranged downstream. To this end, the common discharge line 17 opens into the heat exchanger 321 which is of container-shaped configuration. In the heat exchanger 321, the liquid components of the refrigerant collect on that side of the interior space which is in the direction of gravity. On that side of the interior space which is not in the direction of gravity, an inlet opening 322 of a gas discharge line 323 is arranged, via which gaseous components of the refrigerant are discharged from the heat exchanger 321. The gas discharge line 323 is connected to an inlet of the compressor. A wall 324 of the heat exchanger 321, which wall is covered with the liquid components in operation, is connected to the common feed line 16 in a thermally conducting manner (but without an exchange of fluid). As a result, the temperature of the refrigerant in the common feed line 16 is lowered, and the temperature of the liquid components in the heat exchanger 321 is increased. The efficiency of the cooling apparatus 310 is increased as a result of the temperature reduction in the common feed line 16. Superheating of the refrigerant which enters into the heat exchanger 321 is ensured by way of the temperature increase of the liquid components in the heat exchanger 321, as a result of which an improved separation of gaseous and liquid components can be realized.

Figure 6:
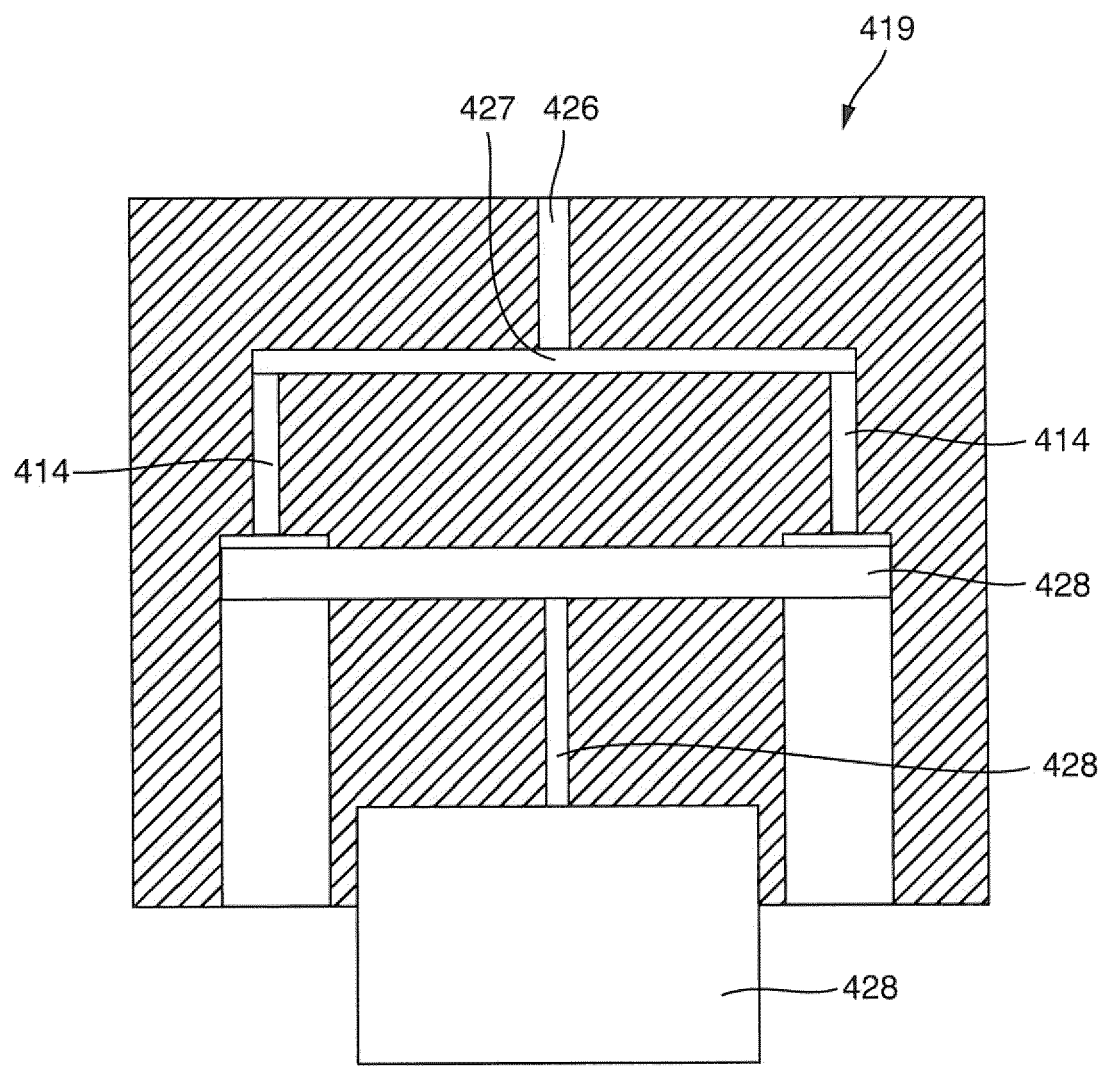
FIG. 6 diagrammatically shows an expansion member for the cooling apparatus according to the invention.

FIG. 6 diagrammatically shows a double expansion member 419 for the cooling apparatus according to the invention. The expansion member 419 can be used in one of the above-described exemplary embodiments. In the interior, the expansion member 419 has a line system with a single inlet opening 426 and a branch 427, which adjoins downstream, into, for example, two inlets 414 which in each case lead to a cooling module 11. An expansion downstream of the branch 427 takes place in the respective inlets 414. This has the advantage that the distribution of the refrigerant is carried out in the high pressure range, that is to say before the expansion, of the expansion member 419, as a result of which a more homogeneous distribution is realized. The expansion member 419 is optionally equipped with a shut-off function via diagrammatically shown shut-off elements 428.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cooling apparatus for energy stores of an electric or hybrid vehicle, comprising:
 a plurality of separate cooling modules for absorbing heat from the energy stores, through which cooling modules refrigerant is flowable, and which cooling modules have in each case one inlet, one outlet, and a plurality of flat tubes;
 a common feed line, from which the respective inlets of the cooling modules branch;
 a common discharge line, into which the respective outlets of the cooling modules open, the cooling modules arranged on both sides of the common feed line and the common discharge line; and
 expansion members that are arranged in the respective inlets and upstream of the plurality of flat tubes, each of the expansion members having a line system with a single inlet and a branch, which adjoins downstream into multiple inlets leading in each case to one of the cooling modules;
 wherein the cooling module inlets and outlets are arranged on respective sides of the cooling modules and the respective sides face towards the common feed line.

2. The cooling apparatus as claimed in claim 1, wherein the expansion members are electric expansion valves, thermal expansion valves or throttles.

3. The cooling apparatus as claimed in claim 1, wherein the expansion members have a shut-off function.

4. The cooling apparatus as claimed in claim 3, wherein the expansion members with the shut-off function are throttling solenoid valves or thermostatic expansion valves.

5. The cooling apparatus as claimed in claim 1, further comprising:
 a shut-off valve for interrupting the refrigerant flow provided in the common feed line upstream of a first inlet and/or downstream of a last outlet.

6. The cooling apparatus as claimed in claim 1, wherein the cooling modules have the plurality of flat tubes which are arranged in one plane and are connected to one another at their longitudinal ends by way of header tubes.

7. The cooling apparatus as claimed in claim 6, wherein the common feed line and the common discharge line are configured separately from one another.

8. The cooling apparatus as claimed in claim 6, wherein the common feed line and the common discharge line are configured within one line, and
 the common feed line and the common discharge line are separated from one another by way of a dividing wall which runs in the longitudinal direction of the one line.

9. The cooling apparatus as claimed in claim 1, wherein the common feed line and the common discharge line are configured separately from one another.

10. The cooling apparatus as claimed in claim 1, wherein the common feed line and the common discharge line are configured within one line, and
 the common feed line and the common discharge line are separated from one another by way of a dividing wall which runs in the longitudinal direction of the one line.

11. The cooling apparatus as claimed in claim 1, wherein the cooling modules are arranged in a flat and overlap-free manner.

12. The cooling apparatus as claimed in claim 1, wherein the cooling modules each have an identical configuration.

13. The cooling apparatus as claimed in claim 1, further comprising:
a heat exchanger provided downstream of a last outlet, wherein the heat exchanger is configured to separate components of the refrigerant.

14. The cooling apparatus as claimed in claim 13, wherein a discharge line for the gaseous components is connected to an inlet of a compressor.

15. The cooling apparatus as claimed in claim 14, wherein a wall of the heat exchanger is connected to the common feed line in a thermally conducting manner.

16. The cooling apparatus as claimed in claim 13, wherein a wall of the heat exchanger is connected to the common feed line in a thermally conducting manner.

17. The cooling apparatus as claimed in claim 1, wherein the expansion members are provided in pairs, two expansion members being provided and being connected to a same fluid inlet.

18. An energy store system, comprising:
the cooling apparatus as claimed in claim 1.

19. A motor vehicle, comprising:
the cooling apparatus as claimed in claim 1.

20. A cooling apparatus for energy stores of an electric or hybrid vehicle, comprising:
a plurality of separate cooling modules for absorbing heat from the energy stores, through which cooling modules refrigerant is flowable, and which cooling modules have in each case one inlet, one outlet, and a plurality of flat tubes;
a common feed line, from which the respective inlets of the cooling modules branch;
a common discharge line, into which the respective outlets of the cooling modules open; and
expansion members that are arranged in the respective inlets and upstream of the plurality of flat tubes, each of the expansion members having a line system with a single inlet and a branch, which adjoins downstream into multiple inlets leading in each case to one of the cooling modules.

\* \* \* \* \*